Patented Oct. 10, 1950

2,525,177

UNITED STATES PATENT OFFICE 2,525,177

VINYL RESIN COMPOSITIONS AND MOLDS PRODUCED THEREFROM

William C. Lockwood, Los Angeles, Calif., assignor to Calresin Corporation, Culver City, Calif., a corporation of California No Drawing. Application October 18, 1946, Serial No. 704,278

17 Claims. (Cl. 18—47)

This invention relates to vinyl resin compositions suitable for molds for the casting of thermosetting resinous compositions.

As commonly practiced the art of casting thermosetting resins consists in pouring a liquid monomer or a partially polymerized, relatively low molecular weight polymer, together with a suitable catalyst, into a mold of suitable shape, allowing the reaction of polymerization to occur in the mold at a curing temperature of about 150° to 200° F.

Lead or lead antimony alloys are commonly employed in forming the molds for such casting operations. Thus, a steel mandrel or master mold, as desired, is dipped into a molten bath of lead or lead antimony alloy. Upon withdrawal a shell congeals around the arbor and this shell is stripped off to give the desired mold. Rubber molds are also employed for such casting operations. In such case the design mold is coated with a film of rubber by dipping it into rubber latex or rubber solution. A film of sufficient thickness is built up by repeated dipping. The film may then be stripped off and used as a mold form after reinforcement with plaster. Plaster forms have been used by forming the plaster mold of desired shape and then coating the interior surface of the plaster with rubber. More recently it has been suggested to form the molds of a phenolic resin.

All of such molds are single-use molds or, as in the case of the plaster and the phenolic resin type molds, they can be used only for a limited number of castings. In the case of the lead molds, they may be used only once and then they are remelted and reshaped to subsequent formation of the cast object. In the case of the plaster and phenolic molds, they must be employed with a parting agent, and in most circumstances the phenolic castings stick to the mold and the mold must be destroyed in order to separate the casting from the mold.

In all such cases it is important that the molds from either a straight draw type or a split type. A straight draw type mold cannot be employed where the object to be cast has undercuts or is of complicated design. Designs such as fluting, beads, and scallops must run in the direction in which the casting will be removed from the mold. Split molds are extremely difficult to use with phenolic castings, since it is virtually impossible to prevent leakage.

It is an object of my invention to cast complicated or simple shapes from thermosetting resins, such as phenolics, allyl ester type resins such as the diallyl phthalate resins and the Kriston type resins recently made available by the Goodrich Chemical Company and understood to be an allyl ester type with an unknown acid radical. Such molds may be cheaply manufactured and repeatedly used without remelting and reforming.

I have developed a mold and mold-forming composition which is stable at the curing temperature of the resin cast in the mold. The resin employed in such mold is inert and will not inhibit the polymerization and curing of the thermosetting resin at the mold surface. It has sufficient fluidity so that it may be cast without entrapment of air bubbles to form perfectly smooth mold surfaces. The decomposition point of the resin composition is sufficiently above its melting point that it may be heated to a temperature sufficiently high to give a free-flowing melt without decomposition or impairment of its properties. When formed into a mold it has sufficient rigidity to act as a mold for the casting of thermosetting resin.

It is another object of my invention to develop this mold sufficiently flexible so that it may be distorted readily after the curing of the resin to permit the withdrawal of the resin casting, notwithstanding that it has a complicated shape and deep undercuts and re-entrant angles.

A further object of my invention is to develop such a resin and mold which may be remelted and recast into a new mold.

As is generally well known, the polyvinyl chloride resins are hard, substantially infusible, and which may, by suitable plasticization, be converted into gel type, rubbery like resins having considerable elasticity, strength, and hardness. The completely polymerized vinyl chloride may be so plasticized with from 5 to 7 times its weight of plasticizer at a temperature of 150° C. Plasticizers which have heretofore been suggested for the solvent plasticizing of vinyl chloride resins to give them a gel consistency of considerable flexibility are: tricresyl phosphate, dibutyl phthalate, benzyl benzoate, and o-nitro-diphenyl ether.

Such plasticized polyvinyl chloride resins may be used and have in the past been suggested for use for the forming of molds for the casting of plaster objects, and these molds are sufficiently flexible so that objects of complicated shape and with re-entrant angles and undercuts may be molded and removed by the distortion of the mold.

I have found that such compositions are not suitable for molds for the casting of thermosetting resins, such as the phenolic resins or the other thermosetting resins heretofore referred to. The melting point of these materials is so close to their decomposition point that they may not be readily melted and cast without sufficient decomposition to be unsatisfactory. For this reason, also, sufficiently fluid melts may not be obtained so that molds may not be formed without entrapment of masses of air bubbles. These bubbles, upon heating in the curing ovens for the cure of the resins cast in such molds, expand and form blisters on the mold surface.

Another and most important objection to this type of resin for this purpose is that the mold surface seems to inhibit the polymerization of the phenolic resin irrespective of the catalyst employed, whether they be acid or alkaline catalysts. The phenolic casting remains soft and gummy at the surface against the mold though the cure goes to completion at the center.

I have found that the polyvinyl chloride polymer and the polyvinyl chloride-acetate co-polymer containing more than 88% polyvinyl chloride may be suitably compounded to give a very successful and useful material for the forming of molds for the casting of the thermosetting resins.

I have found that a suitably chosen chlorinated terphenyl (chlorinated xenyl benzol) or chlorinated isomeric terphenyl or a mixture of the chlorinated diphenyl (xenyl chloride) and chlorinated terphenyls, when added to a suitably plasticized polyvinyl chloride or polyvinyl chloride-acetate resin not only increases the fluidity of the molten resin so that it may be free-flowing at temperatures well below its decomposition point, but also increases the heat stability of such a resin. Without the terphenyl compound the plasticized vinyl may not be heated above a temperature of about 320 to 350° F. without darkening and thickening the mass, whereas on addition of the terphenyl compound the mass may be heated to about 380 to 400° F. without danger. This reduction in the melting point and the increase in the fluidity of the resin composition are made without any detriment to the character of the congealed plastic mass in that the mass does not appear to be tacky or sticky as would be the case where this increase in melting point is caused by addition of conventional plasticizers mentioned above.

The terphenyl compound does not act as a plasticizer in this formulation, since the gel properties of the plasticized vinyl, i. e., its stability, flexibility, and other plastic properties, are not materially altered by their additions. However, they do have a solvent action in that the mass is made more free-flowing at lower temperatures than are obtainable without their addition.

A further advantage in the use of the xenyl compound is that it reduces the tendency of the plasticizer to "sweat out" at the temperatures employed in the curing of the cast thermosetting plastic resins in the mold.

To such a mixture I also add a modicum of oil which does not polymerize at the temperature of curing or mold forming, such as a white oil or a well purified mineral lubricating oil such as is used for lubrication of internal combustion motors or a fatty oil such as castor oil. I also may add to the oil, and preferably do so, well known oxidation inhibitors, such as have been heretofore employed as oxidation inhibitors for motor lubricating oils, for example, the alkali metal salts of para isoamyl, ortho hydroxy, diphenyl sulphides, or reaction products $P_2S_5$ with tertiary alcohols or alicyclic alcohols. Such inhibitors are quite commonly and widely employed as antioxidants in motor lubricants. The oil may contain about .25 to 1% of such inhibitor or an amount usually employed for oxidation inhibition of lubricating for spark ignition or compression ignition motors.

A composition for the forming of molds for the casting of thermosetting resins according to my invention may have the following:

| Components | By weight |
|---|---|
| | Per cent |
| Chlorinated terphenyls or mixtures of chlorinated terphenyls and chlorinated diphenyls | 16-32 |
| Polyvinyl chloride or polyvinyl chloride acetate resin | 14-20 |
| Plasticizers | 45-57 |
| Oil | 5-10 |

The chlorinated terphenyls or mixtures of chlorinated terphenyls and diphenyls are sold under the trade name "Aroclors" by the Monsanto Chemical Company. A suitable Aroclor is the Aroclor 5460 (nonochlorterphenyl), which has the following properties:

| | |
|---|---|
| Form | Yellow transparent resin |
| Density: | |
| Specific Gravity 25°/25° C. (77°/77° F.) | 1.740 to 1.745. |
| Pounds per gallon—25° C. (77° F.) | 14.50. |
| Evaporation Loss, Per Cent, ASTM D-6 Mod.: | |
| 163° C., 5 hrs | 0.025. |
| 100° C., 6 hrs | 1.51 to 1.71 (at 260°—5 hrs.). |
| Flash Point—Cleveland Open Cup, °C | None. |
| Fire Point—Cleveland Open Cup, °C | None. |
| Softening Point—ASTM E-28: | |
| °C | 100° to 105.5° C. |
| °F | 212° to 222° F. |

Other chlorinated terphenyls and mixtures of chlorinated isomeric terphenyls and their mixtures with chlorinated diphenyls may be employed, depending upon whether the xenyl compound is the simple terphenyl or mixture of isomeric terphenyls or mixtures therewith of diphenyls and upon the degree of chlorination thereof.

It is desirable to employ the resinous type of chlorinated xenyl hydrocarbons, to wit, those which are solids and not liquids or viscous or sticky solids at ordinary temperature. It is also desirable to employ such chlorinated terphenyl derivative having a melting point below about 300° F. or a softening point below about 275° F. Compounds having higher melting points tend to crystallize out of the mass and impair its fluidity and suitability as a mold.

Experience has shown that when the ratio of the Aroclor to the vinyl resin is increased to greater than 2:1 the plastic memory of the material is impaired while the stability does not seem to be further increased. Reducing the ratio of Aroclor to the vinyl resin below 1:1 reduces the temperature interval between the temperature for the production of a free-flowing mass and the break-down point of the resin.

The vinyl resin may not usefully be reduced to less than about 14%, as, for example, if it is reduced to below about 14% the cast material is too limber, weak, and sticky. If the vinyl resin is increased to above about 20%, the melting point is too close to the decomposition point and the resin composition may not be conveniently melted for pouring without impairment of its qualities. The mass may not be heated to a high enough temperature to give a free-flowing mass which would be of sufficiently low viscosity not to entrap bubbles of air without undesirable decomposition.

I have found the following plasticizers suitable for use in the above formulations: dioctyl phthalate, tricresyl phosphate, or blends of amyl phosphates sold by Monsanto Chemical Company as "Santicizer 140," butyl phthallyl butyl glycolate, dicapryl phthalate.

The percentages of the plasticizers which may be employed as given in the above table represent the maximum and minimum proportions which may be usefully employed in producing the composition of my invention. The maximum amount of plasticizer, to wit, 57%, gives a composition which melts down quickly at a sufficiently low temperature to prevent scorching and forms a fluid melt in which the bubbles rise and disperse. It pours like a smooth syrup at temperatures below the decomposition and scorching point. If the amount of plasticizer reaches beyond 57% the material becomes too limber, weak, and tacky.

Reducing the amount of plasticizer down to about 45% gives a material which is stiffer. It pours with reasonable freedom at temperatures of about 320 to 340° F. and the temperature interval between such free-flowing melt and the decomposition point, which is about 380 to 400° F., is less than in the case of the formulation employing the higher percentages of plasticizer.

The oil forms an important component of the mold composition and has a material effect upon the utility of this material for the repeated casting of complicated or simple shapes in the mold. It produces self-lubricating molds, particularly at thermosetting resin-curing temperatures due to the exudation of oils from the body of the vinyl plastic mold to the mold surface. Without the oil the thermosetting resin casting tends to stick to the mold surface if several casts are made in the same mold. With the oil included I have been able to make in excess of one hundred castings out of one mold without any sticking of the casting to the mold. Furthermore, the lubricated mold which is thus filmed with the oil by exudation produces a much shinier phenolic cast than does a mold which does not have this oil. I do not employ an amount of oil which is greater than the oil saturation value of the congealed vinyl resin composition. When an amount of oil is used in excess of the saturation value, the oil is expelled when the molten vinyl resin is cast over the pattern to form the mold. This is apt to cause a distortion in the form of pock marks on the surface of the vinyl mold. Such an excess amount of oil reduces the stability of the material under heat and will cause an excessive exudation of oil which pits the surface of phenolic casting.

The safe range of oil is given in the above tabular formulation.

I prefer to employ an oil which is non-volatile at temperatures of cure or of melting of the vinyl resin; in other words, an oil which is substantially non-volatile at 400° F.

A suitable oil is castor oil or mineral oil, such as a white oil or a refined naphthenic or paraffinic oil such as a solvent refined lubricating oil or a paraffin oil such as a Pennsylvania oil.

It is preferred to employ a stable oil, one which will not resinify or polymerize the melt in forming the mold or at temperatures of cure, and this stability may be improved by incorporating in the oil an antioxidant such as those previously discussed.

The above formulations and percentages are given as based on the components as recited in the above table. Unless otherwise stated the percentages given in the claims are based on the vinyl resin, plasticizer, chlorinated terphenyl compound and oils without reference to other components which I may add to the resin composition.

To the composition as stated in the above table waxes may be added, such as ceresine wax or paraffin wax or beeswax, to help eliminate tack. Fillers, such as fine china clay, may also be employed, or any fine filler free of grit or alkali would also be useful. The following formulations have been found to give good results in the service as described above:

| Formula | Per cent by Weight | | |
| --- | --- | --- | --- |
| | 1 | 2 | 3 |
| Nonochlorterphenyl | 24 | 28 | 28 |
| Polyvinyl chloride resin | 16 | 16 | 20 |
| Dioctyl phthalate | 30 | 24 | 24 |
| Tricresyl phosphate | 22 | 24 | 22 |
| Solvent extracted, 40 SAE grade: | | | |
| Motor lubricating oil | 6 | 6 | 4 |
| Castor oil | 2 | 2 | 2 |
| | 100 | 100 | 100 |

The compositions given above may be melted at temperatures well below the decomposition point to give free-flowing fluid melts which may be cast without inclusion of bubbles. They have considerable strength and rigidity, when cast, at temperatures up to about 220° F. The mold surface is not tacky or sticky, but is self-lubricating, so that smooth castings of phenolic or other thermosetting resins may be repeatedly made in the same mold and easily removed. The molds are flexible so that castings of complicated shape and with deep undercuts and re-entrant angles and easily removable are formed.

An important consideration is that the thermosetting resin cures at the mold surface completely, and does not remain tacky or sticky. The mold apparently has no inhibitory effect upon the curing of the phenolic or other thermosetting resin.

While its outstanding use is in the casting of thermosetting resins, these molds may be used in the forming of other castings, such as plaster, cement, gypsum, synthetic marble, etc., where the castings are complicated and the flexibility of the mold may be of advantage.

While I have described a particular embodiment of my invention for the purpose of illustration, it should be understood that various modifications and adaptations thereof may be made within the spirit of the invention as set forth in the appended claims.

I claim:

1. A resinous composition having, when cast and congealed, flexibility and rubber-like properties suitable for forming molds for casting of thermosetting resin, which includes a vinyl resin taken from the class consisting of polyvinyl chloride and polyvinyl chloride acetate resins, which polyvinyl acetate resins contain in excess of 88% vinyl chloride, a resinous chlorinated terphenyl hydrocarbon compound, which compound is solid at room temperature, and, in addition, plasticizers for said vinyl resin, and an oil substantially non-polymerizable and substantially non-volatile when exposed to temperatures up to substantially 400° F., the resin and plasticizer being so proportioned that said composition is free-flowing and substantially undecomposed when heated to a temperature of substantially 380 to 400° F. and of sufficient rigidity to maintain its mold shape at temperatures of about 150–200° F.

2. A resinous composition having, when cast and congealed, flexibility and rubber-like properties suitable for forming molds for casting of thermosetting resin, which includes a vinyl resin taken from the class consisting of polyvinyl chloride and polyvinyl chloride acetate resins, which polyvinyl acetate resins contain in excess of 88% vinyl chloride, a resinous chlorinated terphenyl being free-flowing and substantially undecomposed when heated to a temperature of about 380 to 400° F. and of sufficient rigidity to maintain its mold shape at temperatures of about 150–200° F.

3. A resinous composition which includes 14–20% by weight of a vinyl resin taken from the class consisting of polyvinyl chloride and polyvinyl chloride acetate resins, containing in excess of 88% of vinyl chloride, 16–32% by weight of a resinous chlorinated terphenyl hydrocarbon compound, which compound is solid at room temperature, 45–57% by weight of plasticizers for said vinyl resin, and 5–10% by weight of an oil substantially non-polymerizable and non-volatile when exposed to temperatures up to about 400° F., said composition being free-flowing and substantially undecomposed when heated to a temperature of about 380–400° F. and of sufficient rigidity to maintain its shape at temperatures of about 150–200° F.

4. A resinous composition which includes 14–20% by weight of vinyl resin, taken from the class consisting of polyvinyl chloride and polyvinyl chloride acetate resins containing in excess of 88% of vinyl chloride, 16–32% by weight of a resinous chlorinated terphenyl hydrocarbon compound, which compound is solid at room temperature, 45–57% by weight of plasticizers for said vinyl resin, said composition being free-flowing and substantially undecomposed when heated to a temperature of substantially 380–400° F. and of sufficient rigidity to maintain its shape at temperatures of about 150–200° F.

5. A resinous compostion having, when cast and congealed, flexibility and rubber-like properties suitable for forming molds for casting of thermosetting resin, which includes a vinyl resin taken from the class consisting of polyvinyl chloride and polyvinyl chloride acetate resins, containing in excess of 88% vinyl chloride, a chlorinated terphenyl hydrocarbon compound solid at room temperature and having a melting point less than substantially 300° F., plasticizers for said vinyl resin, and an oil substantially non-polymerizable and non-volatile when exposed to temperatures up to substantially 400° F., the resin and plasticizer being so proportioned that said composition is free-flowing and substantially undecomposed when heated to a temperature of substantially 380–400° F., and of sufficient rigidity to maintain its mold shape at temperatures of substantially 150–200° F.

6. A resinous composition having, 14–20% by weight of a vinyl resin taken from the class consisting of polyvinyl chloride and polyvinyl chloride acetate resins containing in excess of 88% vinyl chloride, 16–32% by weight of a chlorinated terphenyl hydrocarbon compound solid at room temperature having a melting point of less than about 300° F., 45–57% by weight of plasticizers for said vinyl resin, and 5–10% by weight of an oil substantially non-polymerizable and non-volatile when exposed to temperatures up to substantially 400° F., said composition being free-flowing and substantially undecomposed when heated to a temperature of substantially 380–400° F. and of sufficient rigidity to maintain its shape at temperatures of substantially 150–200° F.

7. A mold for the casting of thermosetting resin comprising a body having a cavity of a shape to form a cast of the desired shape in said cavity, consisting essentially of the composition of claim 1.

8. A mold for the casting of thermosetting resin comprising a body having a cavity of a shape to form a cast of the desired shape in said cavity, consisting essentially of the composition of claim 2.

9. A mold for the casting of thermosetting resin comprising a body having a cavity of a shape to form a cast of the desired shape in said cavity, consisting essentially of the composition of claim 3.

10. A mold for the casting of thermosetting resin comprising a body having a cavity of a shape to form a cast of the desired shape in said cavity, consisting essentially of the composition of claim 4.

11. A mold for the casting of thermosetting resin comprising a body having a cavity of a shape to form a cast of the desired shape in said cavity, consisting essentially of the composition of claim 5.

12. A mold for the casting of thermosetting resin comprising a body having a cavity of a shape to form a cast of the desired shape in said cavity, consisting essentially of the composition of claim 6.

13. A resinous composition having, when cast and congealed, flexibility and rubber-like properties suitable for forming molds for casting of thermosetting resin, which includes 14–20% by weight of a vinyl resin taken from the class consisting of polyvinyl chloride and polyvinyl chloride acetate resins, containing in excess of 88% of vinyl chloride, 16–32% by weight of nonochloro terphenyl hydrocarbon compound, 45–57% by weight of plasticizer for said vinyl resin, and 5–10% by weight of a mixture of castor oil and a mineral oil substantially non-polymerizable and non-volatile when exposed to temperatures up to about 400° F., said composition being free-flowing and substantially undecomposed when heated to a temperature of substantially 380–400° F. and of sufficient rigidity to maintain its shape at temperatures of about 150–200° F.

14. A mold for the casting of thermosetting resin comprising a body having a cavity of a shape to form a cast of the desired shape in said cavity consisting essentially of the composition of claim 13.

15. A resinous composition having 14–20% by weight of a vinyl resin taken from the class consisting of polyvinyl chloride and polyvinyl chloride acetate resins, containing in excess of 88% of vinyl chloride, 16–32% by weight of a resinous chlorinated terphenyl hydrocarbon compound, which compound is solid at room temperature, 45–57% by weight of plasticizers for said vinyl resin, and 5–10% by weight of a petroleum oil containing oxidation inhibitor, said composition being free-flowing and substantially undecomposed when heated to a temperature of about 380–400° F. and of sufficient rigidity to maintain its shape at temperatures of about 150–200° F.

16. A resinous composition having, when cast and congealed, flexibility and rubber-like properties suitable for forming molds for casting of thermosetting resin, which includes a vinyl resin taken from the class consisting of polyvinyl chloride and polyvinyl chloride acetate resins, containing in excess of 88% vinyl chloride, a chlorinated terphenyl hydrocarbon compound solid at room temperature and having a melting point less than substantially 300° F., plasticizers for said vinyl resin, and a petroleum oil containing an oxidation inhibitor, the resin and plasticizer being so proportioned that said composition is free-flowing and substantially undecomposed when heated to a temperature of substantially 380–400° F. and of sufficient rigidity to maintain its mold shape at temperatures of substantially 150–200° F.

17. A resinous composition having 14–20% by weight of a vinyl resin taken from the class consisting of polyvinyl chloride and polyvinyl chloride acetate resin containing in excess of 88% vinyl chloride, 16–32% by weight of a chlorinated terphenyl hydrocarbon compound solid at room temperature having a melting point of less than about 300° F., 45–57% by weight of plasticizers for said vinyl resin, and 5–10% by weight of a petroleum oil containing an oxidation inhibitor, said composition being free-flowing and substantially undecomposed when heated to a temperature of substantially 380–400° F. and of sufficient rigidity to maintain its shape at temperatures of substantially 150–200° F.

WILLIAM C. LOCKWOOD.

REFERENCES CITED

The following references are of record in the file of this patent:

UNITED STATES PATENTS

| Number | Name | Date |
| --- | --- | --- |
| 2,048,808 | Oenslager | July 28, 1936 |
| 2,115,214 | Rolle | Apr. 26, 1938 |
| 2,181,481 | Gray | Nov. 28, 1939 |
| 2,318,780 | Humphrey | May 11, 1943 |
| 2,385,879 | Patton | Oct. 2, 1945 |
| 2,414,399 | Sorg | Jan. 14, 1947 |

OTHER REFERENCES

Plasticizer and Resins, Monsanto Chem. Co., May 1940, pages 32–34.

Kratz, "Prevulcanized Latex Molds," Modern Plastics, March, 1939, pages 31 and 64.